United States Patent
Julicher et al.

(10) Patent No.: US 7,103,512 B2
(45) Date of Patent: Sep. 5, 2006

(54) USB EYE PATTERN TEST MODE

(75) Inventors: Joseph Harry Julicher, Chandler, AZ (US); Daniel William Butler, Chandler, AZ (US); Reston A. Condit, Gilbert, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 11/028,377

(22) Filed: Jan. 3, 2005

(65) Prior Publication Data
US 2005/0267712 A1 Dec. 1, 2005

Related U.S. Application Data

(60) Provisional application No. 60/574,565, filed on May 26, 2004.

(51) Int. Cl.
*G01R 27/28* (2006.01)

(52) U.S. Cl. .............. 702/188; 702/120; 702/117; 702/122; 326/86

(58) Field of Classification Search .............. None
See application file for complete search history.

(56) References Cited

U.S. PATENT DOCUMENTS

| | | | |
|---|---|---|---|
| 6,618,686 B1 * | 9/2003 | Allamsetty ................. 702/120 |
| 6,717,439 B1 * | 4/2004 | Ohkubo ....................... 326/86 |
| 6,795,327 B1 * | 9/2004 | Deng et al. .................. 365/63 |
| 6,901,471 B1 * | 5/2005 | Govindaraman ............ 710/305 |
| 2002/0061012 A1 * | 5/2002 | Thi et al. .................... 370/352 |
| 2003/0099147 A1 * | 5/2003 | Deng et al. ............. 365/230.05 |
| 2003/0141900 A1 * | 7/2003 | Ohkubo ....................... 326/86 |
| 2004/0078716 A1 * | 4/2004 | Schulze et al. .............. 714/43 |
| 2004/0131113 A1 * | 7/2004 | Rao ........................... 375/226 |
| 2005/0097403 A1 * | 5/2005 | Chen ........................... 714/43 |
| 2005/0216599 A1 * | 9/2005 | Anderson et al. .......... 709/232 |
| 2005/0235172 A1 * | 10/2005 | Ohie et al. .................. 713/323 |
| 2005/0246582 A1 * | 11/2005 | Nash et al. ................. 714/12 |

OTHER PUBLICATIONS

PCT International Search Report with Written Opinion, PCT/US2005/018647, 13 pages, May 26, 2005.
Don Anderson and Dave Dzatko, "Universal Serial Bus System Architecture," PC System Architecture Series, Second Edition, pp. 25-27, 227-234.
Lee Whetsel, "A Proposed Standard Test Bus and Boundary Scan Architecture," Texas Instruments Incorporated, pp. 330-333.

* cited by examiner

*Primary Examiner*—Carol S. W. Tsai
(74) *Attorney, Agent, or Firm*—Baker Botts L.L.P.

(57) ABSTRACT

A special test mode is incorporated within a USB transceiver of a digital system, and when the special test mode is activated, USB eye pattern test data signal waveforms, e.g., a continuous stream of USB state transitions (defined by the USB specification) are transmitted on the USB data lines connected to the USB transceiver. Conventional test equipment may be attached to the USB data lines and the signal quality monitored. Circuit changes can be made to the digital system and the results easily measured. When the USB eye pattern test data signal waveforms on the USB data lines of the digital system are of satisfactory quality, the special test mode may be turned off and the USB transceiver will resume operation as a normal USB device.

17 Claims, 2 Drawing Sheets

USB EYE PATTERN TEST MODE

RELATED PATENT APPLICATION

This application claims priority to commonly owned U.S. Provisional Patent Application Ser. No. 60/574,565; filed May 26, 2004; entitled "USB Eye Pattern Test Mode," by Joseph Julicher, Daniel Butler and Reston Condit; which is hereby incorporated by reference herein for all purposes.

TECHNICAL FIELD OF THE INVENTION

The present disclosure relates to digital systems, more particularly, to testing of a Universal Serial Bus (USB) interface in a digital system.

BACKGROUND OF THE RELATED TECHNOLOGY

The USB specification calls for very tight control of the electrical signaling on the USB cable. USB is generally described at www.usb.org. Specialized testing fixtures and methods used for validating USB signal integrity (USB IF test) is generally described at http://www.usb.org/developers/compliance/. The USB IF test involves a lengthy and expensive data collection system.

Therefore, there is a need for a simpler and lower cost test that may be completed for preliminary validation of USB operation to help assure first pass design success of the more complex and costly USB IF test.

SUMMARY OF THE INVENTION

The present invention overcomes the above-identified problems as well as other shortcomings and deficiencies of existing technologies, by providing a simple way of injecting USB state transitions on a circuit board and using conventional test equipment to analyze the USB eye pattern signal quality for USB high-speed, USB full-speed, and/or USB low-speed operation.

According to this disclosure, a special test mode is incorporated within a USB transceiver of a digital system. When the special test mode is activated, a continuous stream of USB state transitions (defined by the USB specification) may be observed on the USB data lines (e.g., USB eye pattern test data signal waveforms). When the USB transceiver is in the special test mode, the signal levels conform to the USB specification. This special test mode signal test pattern, however, violates the USB specification so the special test mode is not used when the USB transceiver is attached to a USB host. However, when the special test mode is in progress, conventional test equipment may be attached to the USB data lines of the USB transceiver and the signal quality thereof monitored. Circuit changes can be made to the digital system and the results easily measured. When the continuous stream of USB state transitions, i.e., USB eye pattern, on the USB data lines of the digital system are of satisfactory quality, this special test mode of the present invention may be disabled and the USB transceiver will resume operation as a normal USB device. The digital system may have a digital processor, e.g., microprocessor, microcontroller, digital signal processor (DSP), application specific integrated circuit (ASIC), programmable logic array (PLA), and the like.

According to a specific example embodiment of this disclosure, a digital device having a Universal Serial Bus (USB) test mode comprises: a digital processor; and a USB interface coupled to the digital processor, the USB interface having an eye-pattern test mode selectable with a test enable input, wherein the eye-pattern test mode configures the USB interface to send USB eye pattern test data signal waveforms onto USB data lines coupled to the USB interface, whereby USB signal performance on the USB data lines is verified with standard test equipment. When the test enable input is at a first logic level, the USB interface is in a normal mode of operation. When the test enable input is at a second logic level, the USB interface is in the test mode.

According to another specific example embodiment of this disclosure, a system for testing a digital system Universal Serial Bus (USB) interface with standard test equipment comprises: a digital processor; a USB interface coupled to the digital processor, the USB interface having an eye-pattern test mode selectable with a test enable input, wherein the eye-pattern test mode configures the USB interface to send USB eye pattern test data signal waveforms onto USB data lines coupled to the USB interface; and standard test equipment coupled to the USB data lines for verifying satisfactory performance of the USB eye pattern test data signal waveforms. The standard test equipment is selected from the group consisting of an oscilloscope, a logic analyzer, a data analyzer, a spectrum analyzer, a time domain reflectometer (TDR), and a frequency counter. When the test enable input is at a first logic level the USB interface is in a normal mode of operation and when the test enable input is at a second logic level the USB interface is in the test mode.

According to yet another specific example embodiment of this disclosure, a method for testing a digital system Universal Serial Bus (USB) interface with standard test equipment comprises the steps of: providing a USB interface having an eye-pattern test mode and a normal mode of operation; selecting the eye-pattern test mode so that the USB interface sends USB eye pattern test data signal waveforms onto USB data lines coupled to the USB interface; and verifying satisfactory performance of the USB eye pattern test data signal waveforms with standard test equipment.

One technical advantage is that during testing of the USB interface in a digital system, conventional test equipment may be used to trouble shoot and verify satisfactory operation of the circuit under test. This allows a greater degree of confidence in the digital system circuit design and layout of the USB circuit before the complete USB IF is executed for final validation of the USB circuit of the digital system. Another technical advantage is that the test method is simple and inexpensive, and may be performed by relatively unsophisticated testing personnel. Another technical advantage is that no special test equipment is required to validate the quality of the circuit and layout design of a digital system or subassembly running USB.

Other technical features and advantages will be apparent from the following description of the embodiments, given for the purpose of disclosure and taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawings wherein.

Figure 1:
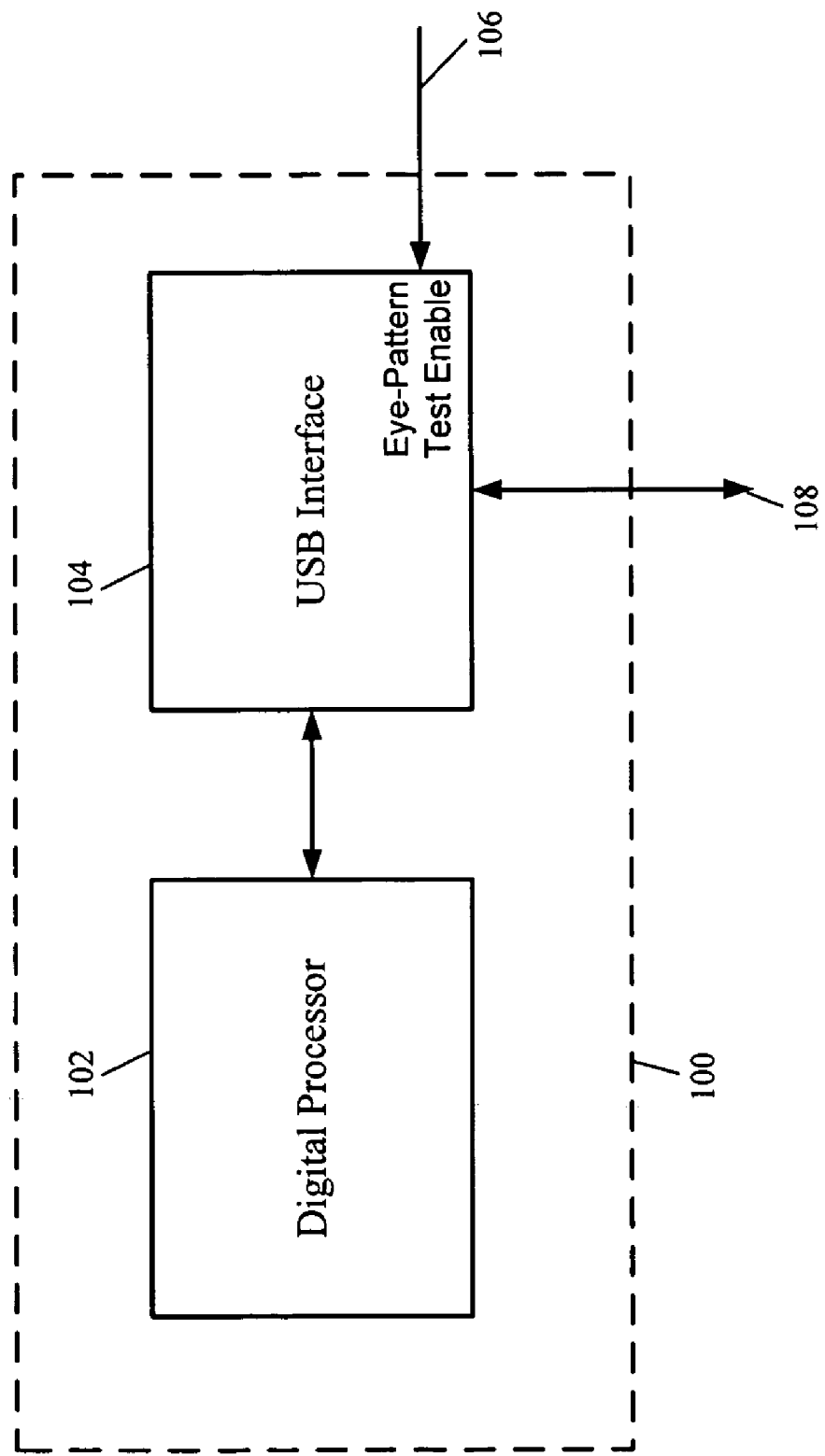
FIG. 1 is a schematic block diagram of a digital system having a USB interface with a test mode feature, according to a specific exemplary embodiment of the invention.

While the present invention is susceptible to various modifications and alternative forms, specific exemplary embodiments thereof have been shown by way of example in the drawing and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Referring now to the drawings, the details of exemplary embodiments of the present invention are schematically illustrated. Like elements in the drawings will be represented by like numbers, and similar elements will be represented by like numbers with a different lower case letter suffix.

Referring to FIG. 1, depicted is a schematic block diagram of a digital system having a USB interface with a test mode feature. The digital system, generally represented by the numeral 100, comprises a digital processor 102 and a USB interface 104 mounted on a printed circuit board (not shown). The USB interface 104 has an eye-pattern test enable control line 106 wherein when the control line 106 is at a first logic level, e.g., a logic "1" or logic "0," the USB interface produces USB signals on the USB data lines 108 that conform to the USB specification. When the control line 106 is at a second logic level, e.g., a logic "0" or logic "1," the USB interface 104 produces USB eye pattern test data signal waveforms, e.g., a continuous stream of USB state transitions (defined by the USB specification), may be observed on the USB data lines 108. The digital processor 102 may be a microprocessor, microcontroller, digital signal processor (DSP), application specific integrated circuit (ASIC), programmable logic array (PLA), and the like.

The USB eye pattern test data signal waveforms may be generated by the USB interface 104 when the control line 106 logic level changes to a test mode logic level, e.g., from a logic "1" to a logic "0" or visa versa. Once the control line 106 logic level changes the USB interface 104 will switch from a receive to a transmit state and will start transmitting a J-K-J-K . . . bit sequence for as long as the control line 106 is held at this test mode logic level. Depending upon the USB speed setting of the USB interface 104, the effective USB pattern will be J-K-J-K . . . for low-speed and K-J-K-J . . . for full-speed. This bit sequence may be repeated indefinitely while the USB eye-pattern test mode is enabled, e.g., when the control line 106 is held at the test mode logic level.

Figure 2:
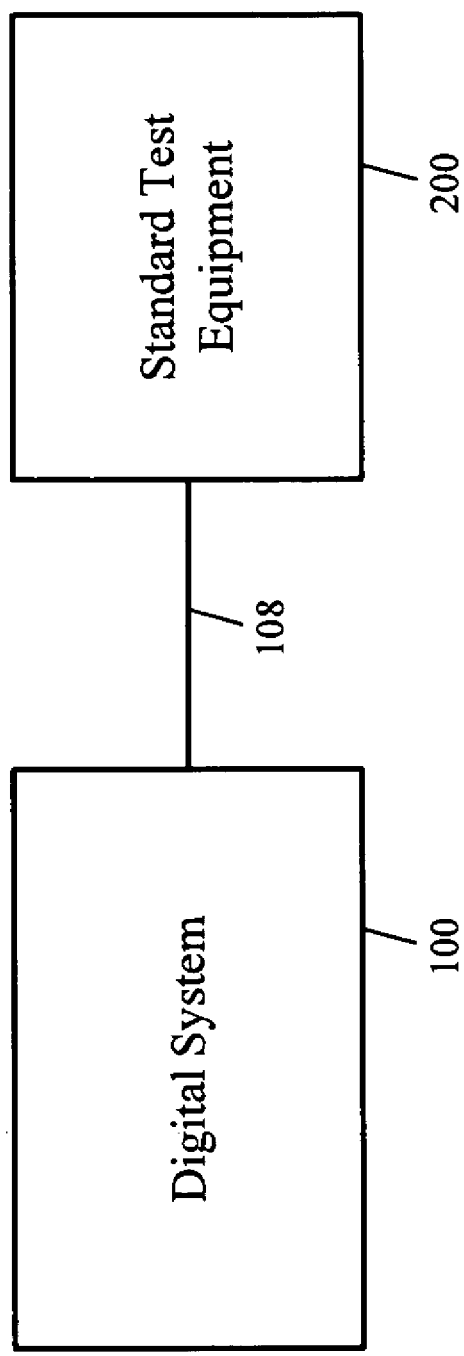
FIG. 2 is a schematic block diagram of the digital system of FIG. 1 wherein a USB bus is tested with standard test equipment.

Referring to FIG. 2, depicted is a schematic block diagram of the digital system of FIG. 1 wherein a USB bus is tested with standard test equipment. Standard test equipment 200 may be coupled to the USB data lines 108 of the digital system 100. The standard test equipment 200 may be, for example but not limited to, an oscilloscope, a logic analyzer, a data analyzer, a spectrum analyzer, a time domain reflectometer (TDR), frequency counter, etc. USB eye pattern test data signal waveforms, e.g., a continuous stream of USB state transitions (J-K-J-K . . . for low-speed and K-J-K-J . . . for full-speed), may be observed on the USB data lines 108 with the test equipment 200 and the effects of various physical and/or electrical changes to the digital system 100 and/or the USB data lines 108, e.g., USB data line routing on the printed circuit board (not shown) that may effect crosstalk from other circuits, standing wave reflections on the data lines, etc.

Circuit changes can be made to the digital system 100 and the results easily measured with the test equipment 200. When the continuous stream of USB state transitions on the USB data lines 108 are of satisfactory quality, the control line 106 may be returned to the first logic level for normal USB signals that conform the USB specification and the USB transceiver will resume operation as a normal USB device. Thereafter the more complicated and costly USB IF test may be performed according to the USB IF test specification.

The digital processor 102 and USB interface 104 may be fabricated on a semiconductor integrated circuit die and this semiconductor integrated circuit die may be packaged in any type of integrated circuit package.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A digital device mounted on a printed circuit board and having a Universal Serial Bus (USB) test mode, comprising:
   a digital processor; and
   a USB interface coupled to the digital processor, wherein the digital processor and USB interface are mounted on a printed circuit board, the USB interface having an eye-pattern test mode selectable by setting a test enable input of the USB interface, wherein the eye-pattern test mode configures the USB interface to send USB eye pattern test data signal waveforms of a Plurality of continuous J-K or K-J bit sequences onto USB data lines on the printed circuit board and coupled to the USB interface, whereby USB signal performance of the printed circuit board USB data lines is verified with standard test equipment.

2. The digital device according to claim 1, wherein when the test enable input is set to a first logic level the USB interface is in a normal mode of operation and when the test enable input is set to a second logic level the USB interface is in the eye pattern test mode.

3. The digital device according to claim 1, wherein the digital processor is selected from the group consisting of a microprocessor, microcontroller, digital signal processor (DSP), application specific integrated circuit (ASIC) and programmable logic array (PLA).

4. The digital device according to claim 1, wherein the USB eye pattern test data signal waveforms are USB state transitions of the plurality of continuous J-K bit sequences for low-speed USB operation.

5. The digital device according to claim 1, wherein the USB eye pattern test data signal waveforms are USB state transitions of the plurality of continuous K-J bit sequences for full-speed USB operation.

6. The digital device according to claim 1, wherein the USB eye pattern test data signal waveforms are USB state transitions of the plurality of continuous K-J bit sequences for high-speed USB operation.

7. A system for testing a digital system having a Universal Serial Bus (USB) interface mounted on a printed circuit board with standard test equipment, said system comprising:
a digital processor;
a USB interface coupled to the digital processor, wherein the digital processor and the USB interface are mounted on a printed circuit board, the USB interface having an eye-pattern test mode selectable by setting a test enable input of the USB interface, wherein the eye-pattern test mode configures the USB interface to send USB eye pattern test data signal waveforms of a plurality of continuous J-K or K-J bit sequences onto USB data lines on the printed circuit board and coupled to the USB interface; and
standard test equipment coupled to the USB data lines for verifying satisfactory performance of the USB eye pattern test data signal waveforms from the USB interface mounted on the printed circuit board.

8. The system according to claim 7, wherein the standard test equipment is selected from the group consisting of an oscilloscope, a logic analyzer, a data analyzer, a spectrum analyzer, a time domain reflectometer (TDR), and a frequency counter.

9. The system according to claim 7, wherein when the test enable input is at a first logic level the USB interface is in a normal mode of operation and when the test enable input is at a second logic level the USB interface is in the test mode.

10. The system according to claim 7, wherein the USB eye pattern test data signal waveforms are USB state transitions of the plurality of continuous J-K bit sequences for low-speed USB operation.

11. The system according to claim 7, wherein the USB eye pattern test data signal waveforms are USB state transitions of the plurality of continuous K-J bit sequences for full-speed USB operation.

12. The system according to claim 7, wherein the USB eye pattern test data signal waveforms are USB state transitions of the plurality of continuous K-J bit sequences for high-speed USB operation.

13. A method for testing a digital system having a Universal Serial Bus (USB) interface mounted on a printed circuit board with standard test equipment, said method comprising the steps of:
providing a USB interface having an eye-pattern test mode and a normal mode of operation;
setting the USB interface to the eye-pattern test mode so that the USB interface sends USB eye pattern test data signal waveforms onto USB data lines on a printed circuit board and coupled to the USB interface, wherein the USB eye pattern test data signal waveforms are a plurality of continuous J-K or K-J bit sequences; and
verifying satisfactory performance of the USB interface by monitoring the USB eye pattern test data signal waveforms on the USB data lines on the printed circuit board with standard test equipment.

14. The method according to claim 13, further comprising the step of selecting the normal mode of operation of the USB interface for testing the USB interface with a USB IF test.

15. The method according to claim 13, wherein the USB eye pattern test data signal waveforms are USB state transitions of the plurality of continuous J-K bit sequences for low-speed USB operation.

16. The method according to claim 13, wherein the USB eye pattern test data signal waveforms are USB state transitions of the plurality of continuous K-J bit sequences for full-speed USB operation.

17. The method according to claim 13, wherein the USB eye pattern test data signal waveforms are USB state transitions of the plurality of continuous K-J bit sequences for high-speed USB operation.

* * * * *